(12) United States Patent
Bhargav-Spantzel et al.

(10) Patent No.: US 10,440,046 B2
(45) Date of Patent: Oct. 8, 2019

(54) TECHNOLOGIES FOR ANONYMOUS CONTEXT ATTESTATION AND THREAT ANALYTICS

(71) Applicant: Intel Corporation, Santa Clara, CA (US)

(72) Inventors: Abhilasha Bhargav-Spantzel, Santa Clara, CA (US); Hormuzd M. Khosravi, Portland, OR (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 14/866,628

(22) Filed: Sep. 25, 2015

(65) Prior Publication Data
US 2017/0093906 A1 Mar. 30, 2017

(51) Int. Cl.
*H04L 29/06* (2006.01)
*H04L 9/32* (2006.01)

(52) U.S. Cl.
CPC ........ *H04L 63/1441* (2013.01); *H04L 9/3218* (2013.01); *H04L 9/3234* (2013.01); *H04L 9/3271* (2013.01); *H04L 63/1433* (2013.01)

(58) Field of Classification Search
CPC ............. H04L 63/1441; H04L 63/1433; H04L 9/3218; H04L 9/3234; H04L 9/3271
See application file for complete search history.

(56) References Cited

U.S. PATENT DOCUMENTS 8,555,072 B2 * 10/2013 Camenisch ........... G06F 21/445
380/30
9,009,827 B1  4/2015 Albertson et al.
(Continued)

FOREIGN PATENT DOCUMENTS

KR  10-2004-0035572  4/2004
KR     10-0862194  10/2008
KR  10-2013-0027941  3/2013

OTHER PUBLICATIONS

"Zero-knowledge proof", downloaded from https://en.wikipedia.org/wiki/Zero-knowledge_proof, originally retrieved Jun. 23, 2015.
(Continued)

*Primary Examiner* — Hee K Song
(74) *Attorney, Agent, or Firm* — Barnes & Thornburg LLP (57) ABSTRACT

Technologies for anonymous context attestation and threat analytics include a computing device to receive sensor data generated by one or more sensors of the computing device and generate an attestation quote based on the sensor data. The attestation quote includes obfuscated attributes of the computing device based on the sensor data. The computing device transmits zero knowledge commitment of the attestation quote to a server and receives a challenge from the server in response to transmitting the zero knowledge commitment. The challenge requests an indication regarding whether the obfuscated attributes of the computing device have commonality with attributes identified in a challenge profile received with the challenge. The computing device generates a zero knowledge proof that the obfuscated attributes of the computing device have commonality with the attributes identified in the challenge profile.

25 Claims, 5 Drawing Sheets

(56) References Cited

U.S. PATENT DOCUMENTS

| | | | |
|---|---|---|---|
| 9,652,604 B1* | 5/2017 | Johansson | G06F 21/36 |
| 9,715,590 B2* | 7/2017 | Gardner | H04L 9/3221 |
| 2009/0019285 A1* | 1/2009 | Chen | G06F 21/575 |
| | | | 713/175 |
| 2009/0210716 A1* | 8/2009 | Chen | G06F 21/33 |
| | | | 713/176 |
| 2013/0139268 A1 | 5/2013 | An | |
| 2015/0281219 A1* | 10/2015 | Kostiainen | H04L 9/3247 |
| | | | 713/156 |

OTHER PUBLICATIONS

"Identity Mixer", downloaded from https://idemix.wordpress.com/, originally retrieved Jun. 23, 2015.
"U-Prove Technology Overview V1.1, Revision 2", downloaded from http://research.microsoft.com/pubs/166980/U-Prove%20Technology%20Overview%20V1.1%20Revision%202.pdf, Apr. 2013, retrieved Jun. 23, 2015.
Brickell et al., "Enhanced Privacy ID (EPID)", downloaded from http://csrc.nist.gov/groups/ST/PEC2011/presentations2011/brickell.pdf, retrieved Jun. 23, 2015.
International Search Report for PCT/US16/048680, dated Nov. 29, 2016 (3 pages).
Written Opinion for PCT/US16/048680, dated Nov. 29, 2016 (4 pages).

* cited by examiner

TECHNOLOGIES FOR ANONYMOUS CONTEXT ATTESTATION AND THREAT ANALYTICS

BACKGROUND

Rapidly evolving cyber-attacks and advanced persistent security threats involve not only malicious individuals but also cyber-criminal organizations collaborating against business enterprises, government organizations, and other institutions. Such malicious individuals and organizations enjoy a collaborative infrastructure to share information regarding system vulnerabilities, successful attacks, and other information useful for attacking a computing system. However, businesses, governments, non-profit organizations, and other groups and individuals do not benefit from the same level of collaboration in sharing threat intelligence and cybersecurity measures in order to prevent attacks. Indeed, concerns regarding sharing corporate data, the lack of a common language for sharing useful information, and/or a lack of resources and infrastructure for sharing such information often intertwine to create a barrier to instituting truly collaborative and universal cybersecurity measures.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
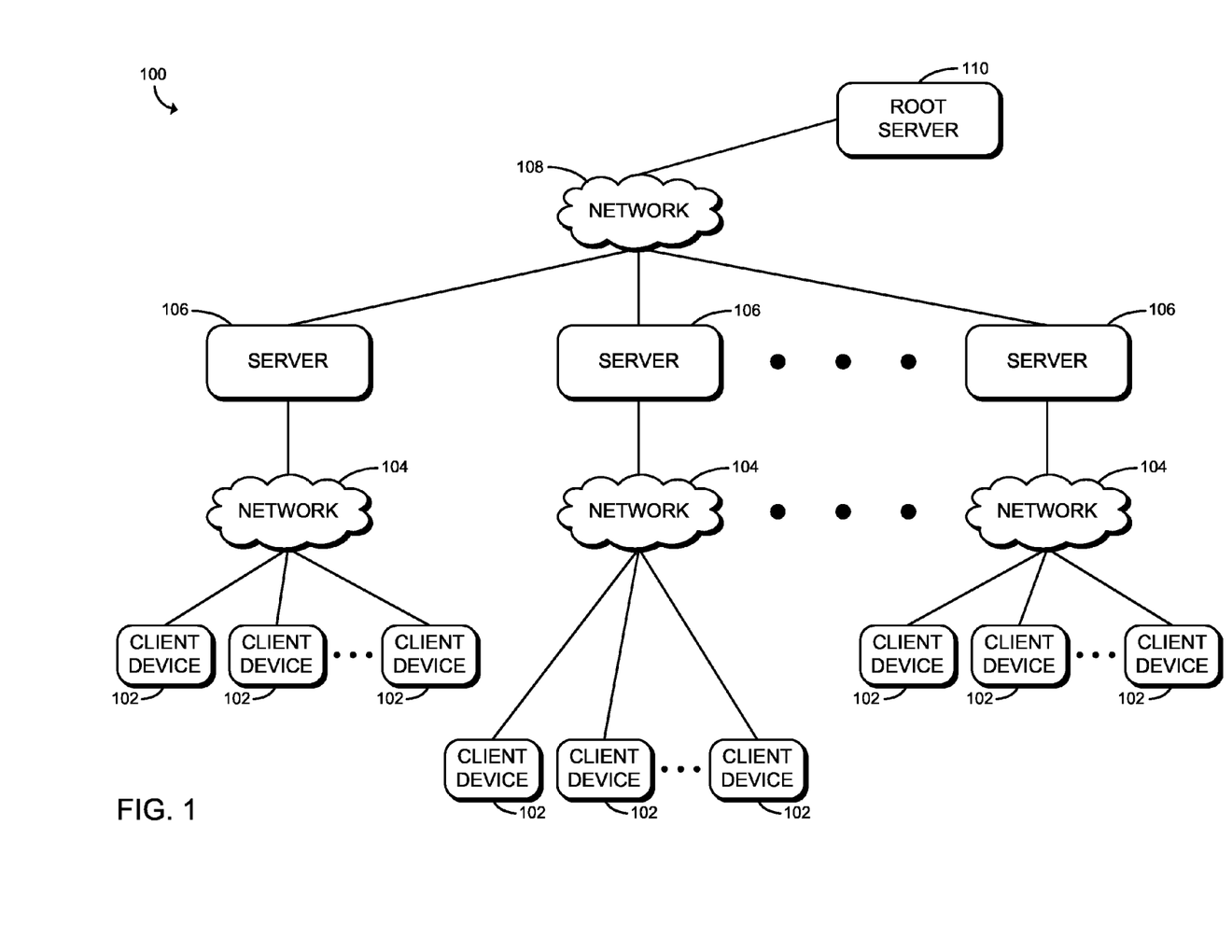
FIG. 1 is a simplified block diagram of at least one embodiment of a system for anonymous context attestation and threat analytics.

Referring now to FIG. 1, a system 100 for anonymous context attestation and threat analytics includes one or more client devices 102, one or more networks 104, one or more servers 106, a network 108, and a root server 110. Although only one root server 110 and one network 108 are illustratively shown in FIG. 1, the system 100 may include any number of root servers 110 and/or networks 108 in other embodiments. Additionally, as shown, the system 100 may include any number of client devices 102, networks 104, and/or servers 106.

As described in detail below, in the illustrative embodiment, the system 100 introduces an OS-independent model for holistic platform attestation and defines a hierarchy of anonymized threat analytics (ATA) nodes such that parent nodes can verify zero knowledge proofs (ZKPs) of the child nodes including threat intelligence data so as to, for example, deduce threat information with minimal information sharing between devices. More specifically, each of the client devices 102 may generate an attestation quote based on sensor data (e.g., hardware and/or software sensor data) of the client device 102 and include anonymized or otherwise obfuscated attributes regarding the client device 102 (e.g., a range of suspicious hash file instances identified, a range of spoofing attacks detected, a group of applications deemed vulnerable, etc.) in the attestation quote for transmittal to a corresponding server 106 (e.g., a server of an enterprise network including the corresponding client devices 102). Based on the attestation quote, the server 106 may challenge the client devices 102 to identify overlap or commonality between the attributes of the client devices 102 and/or reference attribute profiles. It should be appreciated that the system 100 may utilize zero knowledge proofs (e.g., zero knowledge proofs of knowledge) and/or other techniques for attestation while preserving anonymity (e.g., direct anonymous attestation, Enhanced Privacy Identification (EPID) technology, U-Prove technology, Identity Mixer (IDEMIX) technology, etc.).

Figure 2:
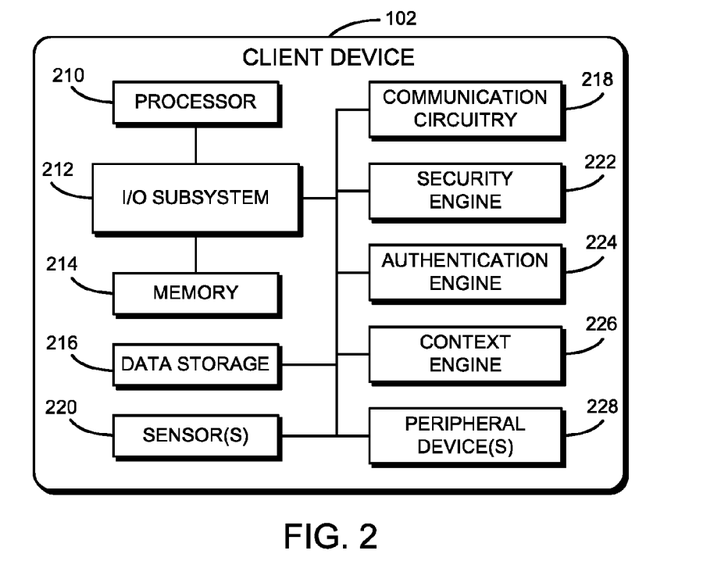
FIG. 2 is a simplified block diagram of at least one embodiment of a client device of the system of FIG. 1.

Each of the illustrative client devices 102 may be embodied as any type of computing device capable of performing the functions described herein. For example, each of the client devices 102 may be embodied as a laptop computer, desktop computer, tablet computer, notebook, netbook, Ultrabook™, cellular phone, smartphone, wearable computing device, personal digital assistant, mobile Internet device, Hybrid device, server, router, switch, and/or any other computing/communication device. Referring now to FIG. 2, an illustrative embodiment of a client device 102 is shown. As shown, the illustrative client device 102 includes a processor 210, an input/output ("I/O") subsystem 212, a memory 214, a data storage 216, a communication circuitry 118, one or more sensors 120, a security engine 222, an authentication engine 224, a context engine 226, and one or more peripheral device(s) 228. Of course, the client device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments. Further, in some embodiments, one or more of the illustrative components may be omitted from the client device 102 (e.g., the security engine 222, the authentication engine 224, the context engine 226, and/or one or more of the peripheral devices 228).

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the client device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the client device 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the client device 102, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the client device 102 as described herein.

The communication circuitry 218 may be embodied as any communication circuit, device, or collection thereof, capable of enabling communications between the client device 102 and other remote devices (e.g., the corresponding server 106) over a network (e.g., the corresponding network 104). The communication circuitry 218 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The sensors 220 may be embodied as any sensors configured to generate data/signals indicative of an environment or context of the client device 102 and/or user of the client device 102. In various embodiments, the sensors 220 may be embodied as, or otherwise include, for example, inertial sensors, position sensors, proximity sensors, optical sensors, light sensors, audio sensors, temperature sensors, motion sensors, piezoelectric sensors, cameras, and/or other types of sensors. Of course, the client device 102 may also include components and/or devices configured to facilitate the use of the sensor(s) 220. Depending on the particular embodiment, the sensors 220 may include hardware sensors and/or software sensors (e.g., software sensors to detect intrusion attempts and viruses and/or determine other application data).

The security engine 222 may be embodied as any hardware component(s) or circuitry capable of performing cryptographic functions and/or establishing a trusted execution environment (TEE). For example, in some embodiments, the security engine 222 may be embodied as a security co-processor, such as a trusted platform module (TPM), or an out-of-band processor.

The authentication engine 224 may be embodied as any hardware component(s) or circuitry capable of performing user and/or device authentication functions. For example, in some embodiments, the authentication engine 224 may be configured to confirm the identity of a user, computing device, and/or component of a computing device. To do so, the authentication engine 224 may utilize a password, unique identifier, and/or any other suitable data.

The context engine 226 may be embodied as any hardware component(s) or circuitry capable of determining a context of the client device 102 and/or a user of the client device 102. To do so, the context engine 226 may analyze data generated by one or more sensors 220 of the client device 102 (e.g., hardware sensors and/or software sensors). It should be appreciated that the context engine 226 may determine the state of the client device 102 at a given point in time.

The peripheral devices 228 may include any number of additional peripheral or interface devices, such as speakers, microphones, additional storage devices, and so forth. The particular devices included in the peripheral devices 228 may depend on, for example, the type and/or intended use of the client device 102.

Referring back to FIG. 1, each of the networks 104 may be embodied as any type of communication network capable of facilitating communication between the client devices 102 and remote devices (e.g., the corresponding servers 106). Similarly, the network 108 may be embodied as any type of communication network capable of facilitating communication between the root server 110 and remote devices (e.g., the servers 106). As such, each of the networks 104, 108 may include one or more networks, routers, switches, computers, and/or other intervening devices. For example, each network 104, 108 may be embodied as or otherwise include one or more cellular networks, telephone networks, local or wide area networks, publicly available global networks (e.g., the Internet), an ad hoc network, or any combination thereof.

Each of the servers 106 and the root server 110 may be embodied as any type of computing device capable of performing the functions described herein. For example, in some embodiments, the servers 106, 110 may be similar to the client device 102 as described above. That is, each of the servers 106, 110 may be embodied as a server, a rack-mounted server, a blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. Further, the servers 106, 110 may include components similar to those of the client device 102 discussed above. The description of those components of the client device 102 is equally applicable to the description of components of the servers 106, 110 and is not repeated herein for clarity of the description. Further, it should be appreciated that the servers 106, 110 may include other components, sub-components, and devices commonly found in a computing device, which are not discussed above in reference to the client device 102 and not discussed herein for clarity of the description. In some embodiments, one or more of the components of the client device 102 may be omitted from one or more of the servers 106, 110 (e.g., the security engine 222, the authentication engine 224, the context engine 226, and/or the peripheral devices 228).

In some embodiments, the servers 106 may be embodied as intermediate or middle aggregators that can verify zero knowledge proofs asserted by child nodes (e.g., corresponding client devices 102). Additionally, in some embodiments, the servers 106 may create additional zero knowledge proofs for the root server 110. The root server 110 may be configured to serve as a global threat intelligence root node that is able to aggregate and verify proofs (e.g., zero knowledge proofs) from multiple nodes (e.g., the servers 106 and/or the client devices 102). Further, in some embodiments, the root server 110 may provide actionable security alerts and/or recommendations to the servers 106 and/or the client devices 102.

In some embodiments, each of the servers 106 may correspond with a different enterprise system or organization. For example, a first server 106 may be associated with an IT organization, a second server 106 may be associated with a pharmaceutical organization, and/or a third server 106 may be associated with a government organization. In such embodiments, the first server 106 may be configured to receive zero knowledge proofs of various obfuscated attributes from the client devices 102 in the network 104 of that server 106. Such attributes may include, for example, location based threat alerts (e.g., source, destination, route, etc.), alert levels in a particular geographical location, a number (e.g., expressed as a range) of suspicious hash file instances identified, a number (e.g., expressed as a range) of spoofing attacks detected, a group of applications deemed vulnerable, platform specific suspicious file hashes, and/or other attributes of the client devices 102.

Figure 3:
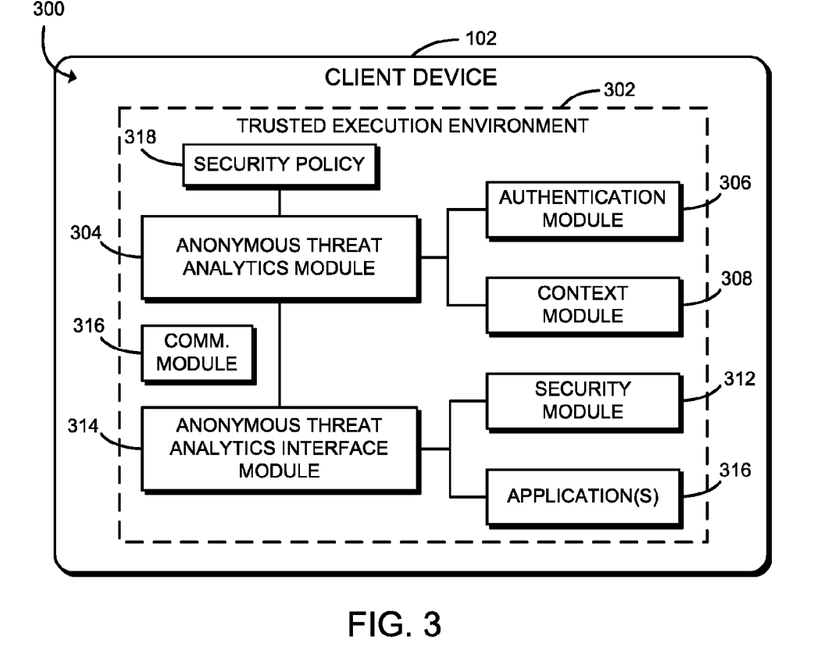
FIG. 3 is a simplified block diagram of at least one embodiment of an environment of the client device of FIG. 2.

Referring now to FIG. 3, in use, the client device 102 establishes an environment 300 for anonymous context attestation and threat analytics. As described herein, the illustrative environment 300 of the client device 102 includes or is otherwise configured to establish a trusted execution environment 302. In some embodiments, the trusted execution environment 302 is established by the security engine 222. As shown, depending on the particular embodiment, one or more of the modules of the environment 300 may be established and/or executed within the trusted execution environment 302.

The illustrative environment 300 further includes an anonymous threat analytics (ATA) module 304, an authentication module 306, a context module 308, an anonymous threat analytics interface module 310, a security module 312, and a communication module 314. The various modules of the environment 300 may be embodied as hardware, software, firmware, or a combination thereof. For example, the various modules, logic, and other components of the environment 300 may form a portion of, or otherwise be established by, the processor 210 or other hardware components of the client device 102. As such, in some embodiments, one or more of the modules of the environment 300 may be embodied as a circuit or collection of electrical devices (e.g., a trusted execution environment circuit, an ATA circuit, an authentication circuit, a context circuit, an ATA interface circuit, and/or a communication circuit). Additionally, in some embodiments, one or more of the illustrative modules may form a portion of another module and/or one or more of the illustrative modules may be independent of one another.

The ATA module 304 is configured to "blind" or anonymize threat information transmitted to the corresponding server 106 by creating cryptographic zero knowledge commitments. In particular, the ATA module 304 may receive sensor data generated by the sensors 220 of the client device 102 (e.g., hardware and/or software sensors) and generate an attestation quote that includes anonymized or otherwise obfuscated attributes of the client device 102 as determined based on the sensor data. For example, in some embodiments, the ATA module 304 may generate a zero knowledge proof of knowledge (ZKPK) that the number of malicious hashes identified by the client device 102 is within a range of 50-100 hashes. In doing so, it should be appreciated that the ATA module 304 may reveal security information without providing details regarding the exact number and/or name of the suspicious hash. As described below, the ATA module 304 may receive requests or challenges regarding the attributes of the client device 102 (e.g., requesting proof that the attributes have commonality or overlap with attributes identified in a reference or challenge profile of the corresponding server 106. As indicated above, in some embodiments, the ATA module 304 may be established in the trusted execution environment 302. Further, in some embodiments, the ATA module 304 may utilize a security policy 318 in generating the attestation quote. The security policy 318 may identify, for example, which attributes should be included in the attestation quote and/or sensors to be used to determine the attributes (e.g., hardware sensors only). It should be appreciated that the ATA module 304 may generate zero knowledge proofs and/or commitments based on any suitable technology. For example, in various embodiments, the ATA module 304 may utilize Enhanced Privacy Identification (EPID) technology, U-Prove technology, and/or Identity Mixer (IDEMIX) technology.

In some embodiments, the ATA module 304 may generate an attestation quote based on sensor data generated by the authentication module 306 and/or the context module 308. The authentication module 306 is configured to handle user and/or device authentication. Accordingly, the authentication module 306 may provide the ATA module 304 with any data associated with the authentication that may be useful in performing the functions described herein. In some embodiments, the authentication module 306 may form a portion of, or be executed by, the authentication engine 224.

The context module 308 may determine the context of the client device 102 based on, for example, sensor data generated by the sensors 220 (e.g., hardware and/or software sensors), the authentication engine 224, and/or any other suitable data of the client device 102. In doing so, the context module 308 may determine the hardware and/or software state (e.g., application execution state) of the client device 102 at a particular point in time. For example, in some embodiments, the context module 308 may determine a location of the client device 102, the network connectivity state, application data, network bandwidth, available storage (e.g., in the memory 214 and/or the data storage 216), the current time, device capabilities, executing applications 316, and/or other characteristics of the client device 102. In some embodiments, the context module 308 may form a portion of, or be executed by, the context engine 226.

The ATA interface module 310 is configured to receive ATA requests and/or other data and forward that information to the ATA module 304 (e.g., executing within the trusted execution environment 302). For example, the ATA interface module 310 may receive ATA/ZKP challenges and/or other suitable requests from the server 106 and forward those requests to the ATA module 304. Similarly, the ATA interface module 310 may receive data from the ATA module 304 (e.g., attestation quotes, ZKP commitments, trusted execution environment proofs of signature, etc.) and transmit that information to the corresponding server 106 or other remote device (e.g., via the communication module 314). Additionally, the ATA interface module 310 may receive data from the security module 312 and/or the applications 316 (e.g., software sensor data) for analysis by the ATA module 304. In some embodiments, it should be appreciated that the ATA interface module 310 may serve as an ATA agent (e.g., software executing on an operating system of the client device 102) configured to interact with a hardware-based ATA module 304.

The security module 312 is configured to perform security-related functions on behalf of the client device 102. In some embodiments, the security module 312 may include a host intrusion prevention system (HIPS) configured to detect and/or prevent unauthorized access attempts to the client device 102 and/or a particular hardware or software component of the client device 102. Further, in some embodiments, the security module 312 may include an anti-virus agent configured to analyze data of the client device 102 and detect viruses, malware, and/or other suspicious content stored on the client device 102. It should be appreciated that the security module 312 may be configured to implement hardware-, firmware-, and/or software-based security measures depending on the particular embodiment. In other embodiments, the security module 312 may be configured to implement software-based security functions, whereas the security engine 222 may be configured to implement hardware- and firmware-based security functions.

The communication module 314 handles the communication between the client device 102 and other computing devices of the system 100 (e.g., the corresponding server 106). For example, as described herein, the client device 102 may transmit attestation quotes and/or ZKPK proofs/commitments to the corresponding server 106 over the corresponding network 104.

Figure 4:
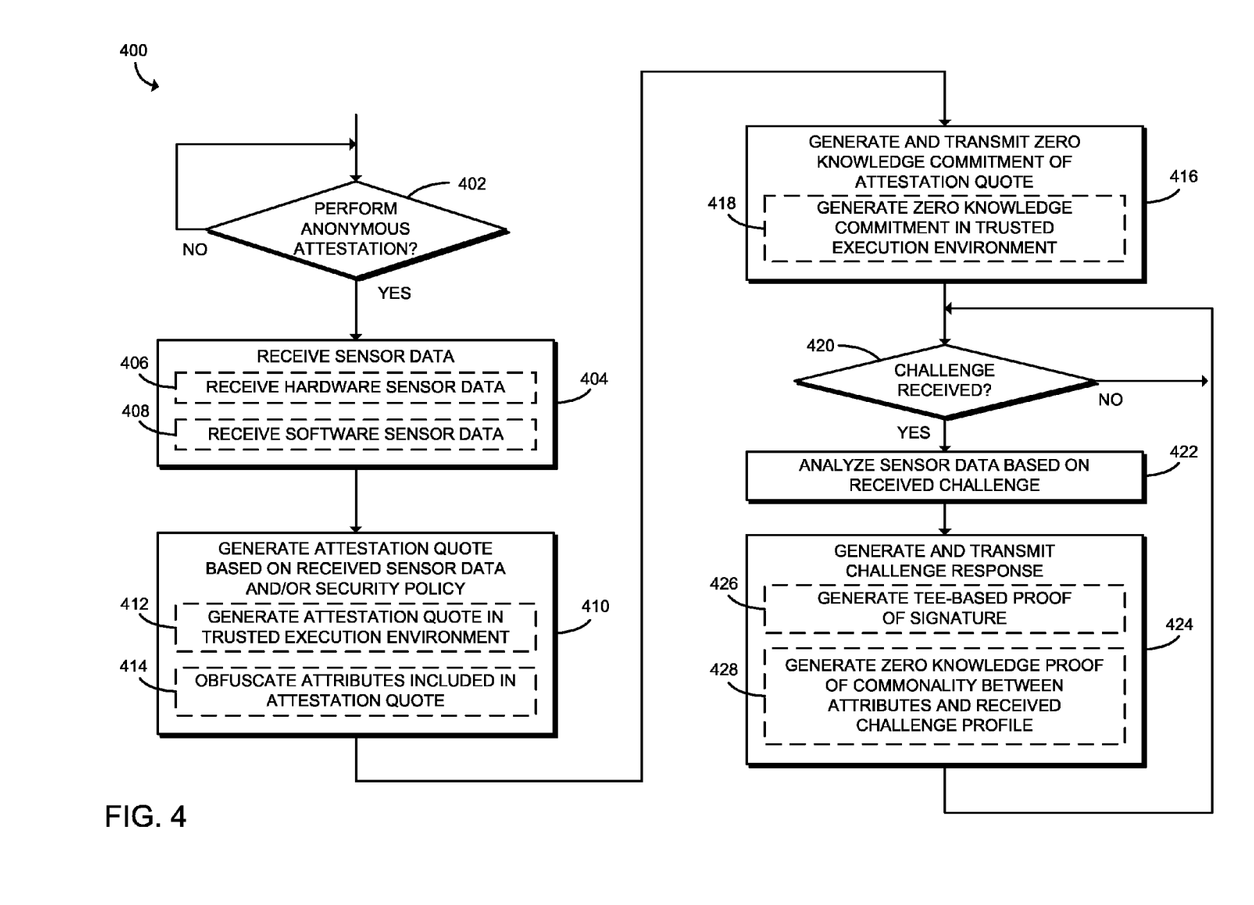
FIG. 4 is a simplified flow diagram of at least one embodiment of a method for anonymous context attestation and threat analytics that may be executed by the client device of FIG. 2.

Referring now to FIG. 4, in use, one or more of the client devices 102 may execute a method 400 for anonymous context/threat attestation and threat analytics. The illustrative method 400 begins with block 402 in which the client device 102 determines whether to perform anonymous threat attestation. If so, in block 404, the client device 102 receives sensor data generated by the sensors 220. As discussed above, the sensors 220 are configured to generate data/signals indicative of an environment or context of the client device 102 and/or user of the client device 102. In particular, in block 406, the client device 102 may receive hardware sensor data generated by one or more hardware sensors of the client device 102. For example, the client device 102 may receive data indicative of a location of the client device 102, a hardware state of one or more components of the client device 102, a physical environment of the client device 102, and/or other features, parameters, and characteristics suitable for performing the functions described herein. Further, in block 408, the client device 102 may receive sensor data from one or more software applications 316 and/or other software sensor data. For example, the client device 102 may receive data indicative of an execution state of a particular software application 316, results of an application execution, and/or other software data (e.g., software-based host intrusion prevention systems and/or software-based anti-virus systems) suitable for performing the functions described herein. Further, in some embodiments, the client device 102 may receive sensor and/or other data generated by the authentication engine 224 and/or the context engine 226. It should be appreciated that the client device 102 may analyze the sensor data to determine various attributes of the client device 102.

Figure 6:
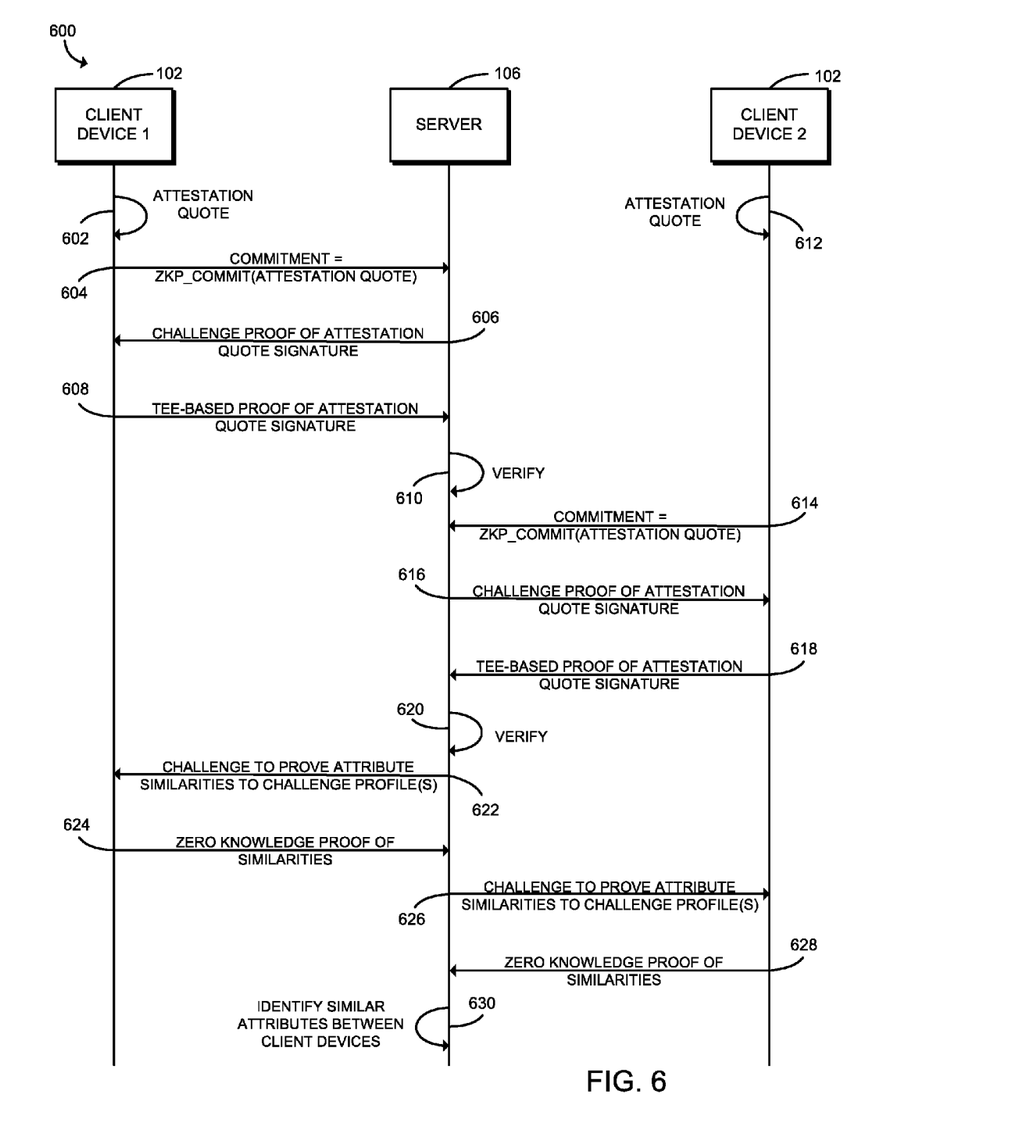
FIG. 6 is a simplified data flow diagram of at least one embodiment of the methods of FIGS. 4-5.

In block 410, the client device 102 generates an attestation quote based on the received sensor data and/or the security policy 318 of the client device 102 (see, e.g., flow 602 of FIG. 6). In some embodiments, in block 412, it should be appreciated that the attestation quote may be generated by (or within) the trusted execution environment 302 of the client device 102. Further, as described above, the client device 102 may obfuscate the attributes included in the attestation quote in block 414. That is, as indicated above, the illustrative attestation quote includes attributes of the client device 102 that have been obfuscated to preserve anonymity (e.g., expressed as a range of values such that the actual value of the corresponding attribute falls within that range).

In block 416, the client device 102 generates a zero knowledge commitment of the attestation quote and transmits the zero knowledge commitment to the corresponding server 106 (see, e.g., flow 604 of FIG. 6). As indicated above, in block 418, the zero knowledge commitment may be generated by (or within) the trusted execution environment 302 of the client device 102. It should be appreciated that the client device 102 may utilize any suitable techniques for generating attestation quotes and utilizing zero knowledge proofs and commitments. For example, in some embodiments, the client device 102 may utilize one or more of direct anonymous attestation, Enhanced Privacy Identification (EPID), U-Prove, and/or Identity Mixer (IDEMIX). Of course, the client device 102 may utilize other suitable techniques in other embodiments. In some embodiments, the attestation quote commitment may be cryptographically signed (e.g., by a private cryptographic key of the client device 102). Further, in some embodiments, the attestation quotes and zero knowledge proofs/commitments may be anonymized such that the server 106 cannot confirm the exact identity of the client device 102 (e.g., by virtue of anonymous attestation).

In block 420, the client device 102 determines whether a challenge has been received from the server 106. As indicated above, the challenge may request, for example, a determination from the client device 102 regarding whether the obfuscated attributes identified in the attestation quote overlap or have commonality with attributes identified in the challenge (e.g., in a "challenge profile" or vulnerability profile). If a challenge has not been received, the method 400 returns to block 420 to wait to receive a challenge or other request. If the client device 102 receives a challenge, the client device 102 may analyze the sensor data or, more specifically, the attributes of the client device 102 based on the received challenge. For example, the client device 102 may determine whether the obfuscated attributes of the client device 102 (e.g., a range of values) has commonality with or otherwise overlaps with the challenge profile attributes.

In block 424, the client device 102 generates a response to the received challenge and transmits the challenge response to the server 106. Of course, it should be appreciated that, in some embodiments, the challenge may be a request to prove the authenticity of the signature on the attestation quote (see, e.g., flow 606 of FIG. 6). In such embodiments, the client device 102 may respond to the challenge, in block 426, by providing a TEE-based proof of the signature (e.g., by the trusted execution environment 302) and may do so without analyzing the sensor data and/or the parameters of the client device 102 (see, e.g., flow 608 of FIG. 6). That is, in some embodiments, the server 106 may verify that the attestation quote signature is authentic prior to requesting further information from the client device 102 (e.g., prior to transmitting challenges regarding the anonymized and obfuscated attributes).

In other embodiments, the challenge may request a determination from the client device 102 regarding whether the obfuscated attributes identified in the attestation quote overlap or have commonality with attributes identified in the challenge as indicated above (see, e.g., flow 622 of FIG. 6). In such embodiments, the client device 102 may generate a zero knowledge proof indicating the commonality or overlap, if any, between the obfuscated attributes of the client device 102 and the challenge profile and transmit the zero knowledge proof to the server 106 in block 428 (see, e.g., flow 624 of FIG. 6). For example, in some embodiments, the client device 102 may determine whether an obfuscated range of an attribute value of the client device 102 is a subset of a range defined by the challenge profile. In other embodiments, the client device 102 may determine whether an obfuscated attribute of the client device 102 overlaps (e.g., is a subset of or otherwise intersects with) an obfuscated attribute of another client device 102 of the system 100 (e.g., another client device 102 within the same network 104 of the corresponding server 106). It should be appreciated that the particular attributes analyzed may include, for example, a number of occurrences of a particular malicious hash identified, a number of snoop attacks detected, and/or a number of attacks received from a particular geographical location; however, the attributes used may vary widely depending on the embodiment.

The illustrative method 400 returns to block 420 in which the client device 102 waits to receive another challenge from the server 106 (e.g., another request to compare the obfuscated attributes to a different attribute profile). It should be appreciated that, in some embodiments, the client device 102 may periodically or occasionally update the attributes based on current sensor data and regenerate/transmit a new attestation quote based on the updated data.

Figure 5:
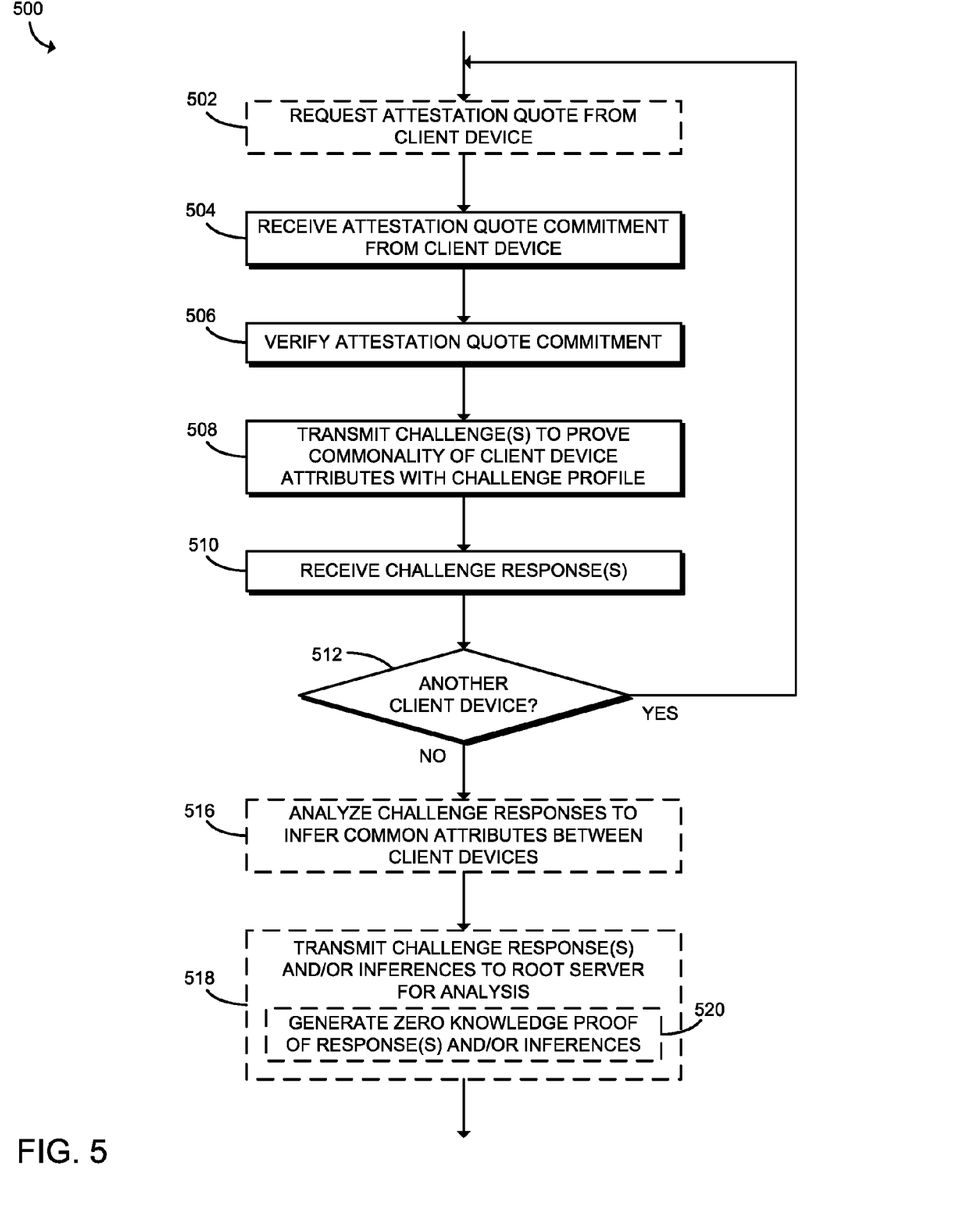
FIG. 5 is a simplified flow diagram of at least one embodiment of a method for anonymous context attestation and threat analytics that may be executed by a server of the system of FIG. 1.

Referring now to FIG. 5, in use, one or more of the servers 106 may execute a method 500 for anonymous context/threat attestation and threat analytics. The illustrative method 500 begins with block 502 in which the server 106 may request an attestation quote from one of the client devices 102 (e.g., a client device 102 within the network 104 of the server 106). In other embodiments, the client device 102 may be configured to transmit attestation quotes to the server 106 without previously receiving a request from the server 106 (e.g., periodically, occasionally, in response to some condition, or otherwise).

In block 504, the server 106 receives an attestation quote commitment from the client device 102 as described above. In block 506, the server 106 verifies the attestation quote commitment received from the client device 102. In some embodiments, to do so, the server 106 may challenge the client device 102 to prove the authenticity of the signature on the attestation quote and, as indicated above, the client device 102 may respond with a TEE-based proof of the signature that the server 106 may confirm.

In block 508, the server 106 transmits one or more challenges to the server 106 to prove commonality, if any, of the attributes of the client device 102 with attributes of one or more challenge profiles identified by the server 106 (e.g., attribute profiles with which the server 106 wishes the client device 102 to compare the client attributes). As indicated above, the client device 102 determines whether there is commonality or overlap with the challenge profile(s) and responds with a zero knowledge proof of the overlap. As such, in block 510, the server 106 receives the challenge response(s) from the client device 102.

In block 512, the server 106 determines whether to transmit one or more challenges to another client device 102 (e.g., another client device 102 in the network 104 of the server 106), which may be analyzed in conjunction with the information received in the zero knowledge proofs of the client device 102 in block 510. If so, the method 500 returns to block 502 in which the server 106 may request an attestation quote from that client device 102 (see, e.g., flows 614-618 and 626-628 of FIG. 6). Of course, as indicated above, the client devices 102 may automatically transmit the attestation quotes to the server 106 in some embodiments. As such, it should be appreciated that the server 106 may communicate with one or more of the client devices 102 in parallel in some embodiments.

If the server 106 determines not to request additional information from other client devices 102, the method 500 advances to block 516 in which the server 106 may analyze the challenge responses to infer common attributes between the client devices 102 (see, e.g., flow 630 of FIG. 6). By doing so, in some embodiments, the server 106 may be able to infer network-wide security risks. Further, in block 518, the server 106 may transmit the challenge responses and/or any inferences determined by the server 106 to the root server 110 for further analysis. Further, as indicated above, the server 106 may generate zero knowledge proofs of the challenge responses and/or inferences and transmit the zero knowledge proofs to the root server 110. In such a way, the servers 106 may also maintain their anonymity while sharing security data that may be beneficial for assessing system-wide security. It should be appreciated that, in some embodiments, the root server 110 may verify the proofs received from the servers 106 of various organizations and analyze the included data to assess, for example, cross-organizational security threats. For example, in an embodiment, the root server 110 may infer whether the locations of attacks for two client devices 102 are within the same vicinity (e.g., country, state, proximity, etc.).

EXAMPLES

Illustrative examples of the technologies disclosed herein are provided below. An embodiment of the technologies may include any one or more, and any combination of, the examples described below.

Example 1 includes a computing device for anonymous context attestation and threat analytics, the computing device comprising an anonymous threat analytics module to (i) receive sensor data generated by one or more sensors of the computing device and (ii) generate an attestation quote based on the sensor data, wherein the attestation quote includes obfuscated attributes of the computing device based on the sensor data; and a communication module to (i) transmit a zero knowledge commitment of the attestation quote to a server and (ii) receive a challenge from the server in response to transmittal of the zero knowledge commitment, wherein the challenge requests an indication regarding whether the obfuscated attributes of the computing device have commonality with attributes identified in a challenge profile received with the challenge; wherein the anonymous threat analytics module is further to generate a zero knowledge proof that the obfuscated attributes of the computing device have commonality with the attributes identified in the challenge profile.

Example 2 includes the subject matter of Example 1, and wherein to receive the sensor data comprises to receive sensor data generated by one or more hardware sensors of the computing device.

Example 3 includes the subject matter of any of Examples 1 and 2, and wherein to receive the sensor data generated by one or more hardware sensors comprises to receive sensor data generated by at least one of an authentication engine or a context engine of the computing device.

Example 4 includes the subject matter of any of Examples 1-3, and wherein to receive the sensor data to receive receiving sensor data from one or more software applications.

Example 5 includes the subject matter of any of Examples 1-4, and wherein to receive the sensor data from the one or more software applications comprises to receive sensor data from at least one of a host intrusion prevention system or an anti-virus agent.

Example 6 includes the subject matter of any of Examples 1-5, and wherein the obfuscated attributes comprise an attribute expressed as a range, wherein an actual value of the corresponding attribute is within the range.

Example 7 includes the subject matter of any of Examples 1-6, and wherein to generate the attestation quote comprises to generate an attestation quote by a trusted execution environment of the computing device.

Example 8 includes the subject matter of any of Examples 1-7, and further including a security engine to establish the trusted execution environment.

Example 9 includes the subject matter of any of Examples 1-8, and wherein to generate the attestation quote comprises to generate an attestation quote based on the sensor data and a security policy.

Example 10 includes the subject matter of any of Examples 1-9, and wherein the security policy identifies at least one of attributes to be included in the attestation quote or sensor data to be used to determine the attributes.

Example 11 includes the subject matter of any of Examples 1-10, and wherein to generate the zero knowledge commitment comprises to generate a zero knowledge commitment based on at least one of Enhanced Privacy Identification (EPID) technology, U-Prove technology, or Identity Mixer (IDEMIX) technology.

Example 12 includes the subject matter of any of Examples 1-11, and wherein the anonymous threat analytics modules is further to generate a proof of a signature of the attestation quote by a trusted execution environment of the computing device in response to receiving a challenge regarding proof of the signature.

Example 13 includes the subject matter of any of Examples 1-12, and wherein the anonymous threat analytics modules is further to analyze the obfuscated attributes of the computing device based on the challenge received from the server.

Example 14 includes the subject matter of any of Examples 1-13, and wherein to generate the zero knowledge proof that the obfuscated attributes of the computing device have commonality with the attributes identified in the challenge profile comprises to determine whether an obfuscated range of an attribute value of the computing device is a subset of a range defined by the challenge profile.

Example 15 includes the subject matter of any of Examples 1-14, and wherein to generate the zero knowledge proof that the obfuscated attributes of the computing device have commonality with the attributes identified in the challenge profile comprises to determine whether an obfuscated attribute of the computing device overlaps with an obfuscated attribute of another computing device.

Example 16 includes the subject matter of any of Examples 1-15, and wherein to generate the zero knowledge proof comprises to generate the zero knowledge proof in response to a determination that the obfuscated attributes of the computing device have commonality with the attributes identified in the challenge profile.

Example 17 includes a method for anonymous context attestation and threat analytics, the method comprising receiving, by a computing device, sensor data generated by one or more sensors of the computing device; generating, by the computing device, an attestation quote based on the sensor data, wherein the attestation quote includes obfuscated attributes of the computing device based on the sensor data; transmitting, by the computing device, a zero knowledge commitment of the attestation quote to a server; receiving, by the computing device, a challenge from the server in response to transmitting the zero knowledge commitment, wherein the challenge requests an indication regarding whether the obfuscated attributes of the computing device have commonality with attributes identified in a challenge profile received with the challenge; and generating, by the computing device, a zero knowledge proof that the obfuscated attributes of the computing device have commonality with the attributes identified in the challenge profile.

Example 18 includes the subject matter of Example 17, and wherein receiving the sensor data comprises receiving sensor data generated by one or more hardware sensors of the computing device.

Example 19 includes the subject matter of any of Examples 17 and 18, and wherein receiving the sensor data generated by one or more hardware sensors comprises receiving sensor data generated by at least one of an authentication engine or a context engine of the computing device.

Example 20 includes the subject matter of any of Examples 17-19, and wherein receiving the sensor data comprises receiving sensor data from one or more software applications.

Example 21 includes the subject matter of any of Examples 17-20, and wherein receiving the sensor data from the one or more software applications comprises receiving sensor data from at least one of a host intrusion prevention system or an anti-virus agent.

Example 22 includes the subject matter of any of Examples 17-21, and wherein the obfuscated attributes comprise an attribute expressed as a range, wherein an actual value of the corresponding attribute is within the range.

Example 23 includes the subject matter of any of Examples 17-22, and wherein generating the attestation quote comprises generating an attestation quote by a trusted execution environment of the computing device.

Example 24 includes the subject matter of any of Examples 17-23, and wherein generating the attestation quote comprises generating an attestation quote based on the sensor data and a security policy.

Example 25 includes the subject matter of any of Examples 17-24, and wherein the security policy identifies at least one of attributes to be included in the attestation quote or sensor data to be used to determine the attributes.

Example 26 includes the subject matter of any of Examples 17-25, and wherein generating the zero knowledge commitment comprises generating a zero knowledge commitment based on at least one of Enhanced Privacy Identification (EPID) technology, U-Prove technology, or Identity Mixer (IDEMIX) technology.

Example 27 includes the subject matter of any of Examples 17-26, and further including generating, by the computing device, a proof of a signature of the attestation quote by a trusted execution environment of the computing device in response to receiving a challenge regarding proof of the signature.

Example 28 includes the subject matter of any of Examples 17-27, and further including analyzing, by the computing device, the obfuscated attributes of the computing device based on the challenge received from the server.

Example 29 includes the subject matter of any of Examples 17-28, and wherein generating the zero knowledge proof that the obfuscated attributes of the computing device have commonality with the attributes identified in the challenge profile comprises determining whether an obfuscated range of an attribute value of the computing device is a subset of a range defined by the challenge profile.

Example 30 includes the subject matter of any of Examples 17-29, and wherein generating the zero knowledge proof that the obfuscated attributes of the computing device have commonality with the attributes identified in the challenge profile comprises determining whether an obfuscated attribute of the computing device overlaps with an obfuscated attribute of another computing device.

Example 31 includes the subject matter of any of Examples 17-30, and wherein generating the zero knowledge proof comprises generating the zero knowledge proof in response to determining that the obfuscated attributes of the computing device have commonality with the attributes identified in the challenge profile.

Example 32 includes a computing device comprising a processor; and a memory having stored therein a plurality of instructions that when executed by the processor cause the computing device to perform the method of any of Examples 17-31.

Example 33 includes one or more machine-readable storage media comprising a plurality of instructions stored thereon that, in response to being executed, result in a computing device performing the method of any of Examples 17-31.

Example 34 includes a computing device comprising means for performing the method of any of Examples 17-31.

Example 35 includes a computing device for anonymous context attestation and threat analytics, the computing device comprising means for receiving sensor data generated by one or more sensors of the computing device; means for generating an attestation quote based on the sensor data, wherein the attestation quote includes obfuscated attributes of the computing device based on the sensor data; means for transmitting a zero knowledge commitment of the attestation quote to a server; means for receiving a challenge from the server in response to transmitting the zero knowledge commitment, wherein the challenge requests an indication regarding whether the obfuscated attributes of the computing device have commonality with attributes identified in a challenge profile received with the challenge; and means for generating a zero knowledge proof that the obfuscated attributes of the computing device have commonality with the attributes identified in the challenge profile.

Example 36 includes the subject matter of Example 35, and wherein the means for receiving the sensor data comprises means for receiving sensor data generated by one or more hardware sensors of the computing device.

Example 37 includes the subject matter of any of Examples 35 and 36, and wherein the means for receiving the sensor data generated by one or more hardware sensors comprises means for receiving sensor data generated by at least one of an authentication engine or a context engine of the computing device.

Example 38 includes the subject matter of any of Examples 35-37, and wherein the means for receiving the sensor data comprises means for receiving sensor data from one or more software applications.

Example 39 includes the subject matter of any of Examples 35-38, and wherein the means for receiving the sensor data from the one or more software applications comprises means for receiving sensor data from at least one of a host intrusion prevention system or an anti-virus agent.

Example 40 includes the subject matter of any of Examples 35-39, and wherein the obfuscated attributes comprise an attribute expressed as a range, wherein an actual value of the corresponding attribute is within the range.

Example 41 includes the subject matter of any of Examples 35-40, and wherein the means for generating the attestation quote comprises means for generating an attestation quote by a trusted execution environment of the computing device.

Example 42 includes the subject matter of any of Examples 35-41, and wherein the means for generating the attestation quote comprises means for generating an attestation quote based on the sensor data and a security policy.

Example 43 includes the subject matter of any of Examples 35-42, and wherein the security policy identifies at least one of attributes to be included in the attestation quote or sensor data to be used to determine the attributes.

Example 44 includes the subject matter of any of Examples 35-43, and wherein the means for generating the zero knowledge commitment comprises means for generating a zero knowledge commitment based on at least one of Enhanced Privacy Identification (EPID) technology, U-Prove technology, or Identity Mixer (IDEMIX) technology.

Example 45 includes the subject matter of any of Examples 35-44, and further including means for generating a proof of a signature of the attestation quote by a trusted execution environment of the computing device in response to receipt of a challenge regarding proof of the signature.

Example 46 includes the subject matter of any of Examples 35-45, and further including means for analyzing the obfuscated attributes of the computing device based on the challenge received from the server.

Example 47 includes the subject matter of any of Examples 35-46, and wherein the means for generating the zero knowledge proof that the obfuscated attributes of the computing device have commonality with the attributes identified in the challenge profile comprises means for determining whether an obfuscated range of an attribute value of the computing device is a subset of a range defined by the challenge profile.

Example 48 includes the subject matter of any of Examples 35-47, and wherein the means for generating the zero knowledge proof that the obfuscated attributes of the computing device have commonality with the attributes identified in the challenge profile comprises means for determining whether an obfuscated attribute of the computing device overlaps with an obfuscated attribute of another computing device.

Example 49 includes the subject matter of any of Examples 35-48, and wherein the means for generating the zero knowledge proof comprises means for generating the zero knowledge proof in response to determining that the obfuscated attributes of the computing device have commonality with the attributes identified in the challenge profile.

The invention claimed is:

1. A computing device for anonymous context attestation and threat analytics, the computing device comprising:
   an anonymous threat analytics circuitry to (i) receive sensor data generated by one or more sensors of the computing device and (ii) generate an attestation quote based on the sensor data, wherein the attestation quote includes obfuscated attributes of the computing device based on the sensor data; and
   a communication circuitry to (i) transmit a zero knowledge commitment of the attestation quote to a server and (ii) receive a challenge from the server in response to transmittal of the zero knowledge commitment, wherein the challenge requests an indication regarding whether the obfuscated attributes of the computing device have commonality with attributes identified in a challenge profile received with the challenge;
   wherein the anonymous threat analytics circuitry is further to generate a zero knowledge proof that the obfuscated attributes of the computing device have commonality with the attributes identified in the challenge profile.

2. The computing device of claim 1, wherein to receive the sensor data comprises to receive sensor data generated by one or more hardware sensors of the computing device.

3. The computing device of claim 2, wherein to receive the sensor data generated by one or more hardware sensors comprises to receive sensor data generated by at least one of an authentication engine or a context engine of the computing device.

4. The computing device of claim 1, wherein to receive the sensor data to receive receiving sensor data from one or more software applications.

5. The computing device of claim 4, wherein to receive the sensor data from the one or more software applications comprises to receive sensor data from at least one of a host intrusion prevention system or an anti-virus agent.

6. The computing device of claim 1, wherein the obfuscated attributes comprise an attribute expressed as a range, wherein an actual value of the corresponding attribute is within the range.

7. The computing device of claim 1, wherein to generate the attestation quote comprises to generate an attestation quote by a trusted execution environment of the computing device.

8. The computing device of claim 7, further comprising a security engine to establish the trusted execution environment.

9. The computing device of claim 1, wherein to generate the attestation quote comprises to generate an attestation quote based on the sensor data and a security policy; and wherein the security policy identifies at least one of attributes to be included in the attestation quote or sensor data to be used to determine the attributes.

10. The computing device of claim 1, wherein to generate the zero knowledge commitment comprises to generate a zero knowledge commitment based on at least one of Enhanced Privacy Identification (EPID) technology, U-Prove technology, or Identity Mixer (IDEMIX) technology.

11. The computing device of claim 1, wherein the anonymous threat analytics circuitry is further to generate a proof of a signature of the attestation quote by a trusted execution environment of the computing device in response to receiving a challenge regarding proof of the signature.

12. The computing device of claim 1, wherein the anonymous threat analytics circuitry is further to analyze the obfuscated attributes of the computing device based on the challenge received from the server.

13. The computing device of claim 1, wherein to generate the zero knowledge proof that the obfuscated attributes of the computing device have commonality with the attributes identified in the challenge profile comprises to determine whether an obfuscated range of an attribute value of the computing device is a subset of a range defined by the challenge profile.

14. The computing device of claim 1, wherein to generate the zero knowledge proof that the obfuscated attributes of the computing device have commonality with the attributes identified in the challenge profile comprises to determine whether an obfuscated attribute of the computing device overlaps with an obfuscated attribute of another computing device.

15. The computing device of claim 1, wherein to generate the zero knowledge proof comprises to generate the zero knowledge proof in response to a determination that the obfuscated attributes of the computing device have commonality with the attributes identified in the challenge profile.

16. One or more non-transitory, machine-readable storage media comprising a plurality of instructions stored thereon that, in response to execution by a computing device, cause the computing device to:
   receive sensor data generated by one or more sensors of the computing device;
   generate an attestation quote based on the sensor data, wherein the attestation quote includes obfuscated attributes of the computing device based on the sensor data;
   transmit a zero knowledge commitment of the attestation quote to a server;
   receive a challenge from the server in response to transmission of the zero knowledge commitment, wherein the challenge requests an indication regarding whether the obfuscated attributes of the computing device have commonality with attributes identified in a challenge profile received with the challenge; and generate a zero knowledge proof that the obfuscated attributes of the computing device have commonality with the attributes identified in the challenge profile.

17. The one or more non-transitory, machine-readable storage media of claim 16, wherein the obfuscated attributes comprise an attribute expressed as a range, wherein an actual value of the corresponding attribute is within the range.

18. The one or more non-transitory, machine-readable storage media of claim 16, wherein to generate the attestation quote comprises to generate an attestation quote by a trusted execution environment of the computing device.

19. The one or more non-transitory, machine-readable storage media of claim 16, wherein to generate the attestation quote comprises to generate an attestation quote based on the sensor data and a security policy; and
wherein the security policy identifies at least one of attributes to be included in the attestation quote or sensor data to be used to determine the attributes.

20. The one or more non-transitory, machine-readable storage media of claim 16, wherein the plurality of instructions further cause the computing device to analyze the obfuscated attributes of the computing device based on the challenge received from the server.

21. A method for anonymous context attestation and threat analytics, the method comprising:
receiving, by a computing device, sensor data generated by one or more sensors of the computing device;
generating, by the computing device, an attestation quote based on the sensor data, wherein the attestation quote includes obfuscated attributes of the computing device based on the sensor data;
transmitting, by the computing device, a zero knowledge commitment of the attestation quote to a server;
receiving, by the computing device, a challenge from the server in response to transmitting the zero knowledge commitment, wherein the challenge requests an indication regarding whether the obfuscated attributes of the computing device have commonality with attributes identified in a challenge profile received with the challenge; and
generating, by the computing device, a zero knowledge proof that the obfuscated attributes of the computing device have commonality with the attributes identified in the challenge profile.

22. The method of claim 21, wherein the obfuscated attributes comprise an attribute expressed as a range, wherein an actual value of the corresponding attribute is within the range.

23. The method of claim 21, wherein generating the zero knowledge proof that the obfuscated attributes of the computing device have commonality with the attributes identified in the challenge profile comprises determining whether an obfuscated range of an attribute value of the computing device is a subset of a range defined by the challenge profile.

24. The method of claim 21, wherein generating the zero knowledge proof that the obfuscated attributes of the computing device have commonality with the attributes identified in the challenge profile comprises determining whether an obfuscated attribute of the computing device overlaps with an obfuscated attribute of another computing device.

25. The method of claim 21, wherein generating the zero knowledge proof comprises generating the zero knowledge proof in response to determining that the obfuscated attributes of the computing device have commonality with the attributes identified in the challenge profile.

* * * * *